United States Patent [19]

Kouta

[11] Patent Number: 5,801,876
[45] Date of Patent: Sep. 1, 1998

[54] LASER-BEAM WAVELENGTH CONVERSION DEVICE AND ULTRAVIOLET BEAM GENERATOR USING THE DEVICE

[75] Inventor: Hikaru Kouta, Tokyo, Japan

[73] Assignee: NEC Corporation, Tokyo, Japan

[21] Appl. No.: 758,822

[22] Filed: Dec. 4, 1996

[30] Foreign Application Priority Data

Dec. 5, 1995 [JP] Japan ................................ 7-316189

[51] Int. Cl.$^6$ ................................................. G02F 1/35
[52] U.S. Cl. ........................................................ 359/326
[58] Field of Search ................................ 359/326–332; 372/21–22

[56] References Cited

U.S. PATENT DOCUMENTS

| | | | |
|---|---|---|---|
| 3,621,273 | 11/1971 | Rorden et al. | 359/328 |
| 4,095,121 | 6/1978 | Begley et al. | 359/327 |
| 5,034,951 | 7/1991 | Edelstein et al. | 372/22 |
| 5,179,562 | 1/1993 | Marason et al. | 372/22 |
| 5,365,366 | 11/1994 | Kafka et al. | 359/330 |
| 5,377,043 | 12/1994 | Pelouch et al. | 359/326 |
| 5,638,388 | 6/1997 | Nighan, Jr. et al. | 372/22 |

FOREIGN PATENT DOCUMENTS

| | | |
|---|---|---|
| 64-82683 | 3/1989 | Japan . |
| 3-179331 | 8/1991 | Japan . |

*Primary Examiner*—John D. Lee
*Attorney, Agent, or Firm*—Young & Thompson

[57] ABSTRACT

In the case of device for wavelength-converting an incoming ordinary ray with a wavelength of 532 nm to an extraordinary ray with a wavelength of 266, the incoming plane to which an ordinary ray is input is formed so as to have a first Brewster's angle to the ordinary ray. Moreover, the outgoing plane of the device from which an extraordinary ray is emitted is formed so as to have a second Brewster's angle to an extraordinary ray. The incoming and outgoing planes of the wavelength conversion device are formed by considering the deflection directions of ordinary and extraordinary rays.

8 Claims, 3 Drawing Sheets

LASER-BEAM WAVELENGTH CONVERSION DEVICE AND ULTRAVIOLET BEAM GENERATOR USING THE DEVICE

BACKGROUND OF THE INVENTION

1. Field of the Invention

The present invention relates to a laser-beam wavelength conversion device and an ultraviolet beam generator using the device, particularly to a laser-beam wavelength conversion device capable of reducing a reflection loss.

2. Description of the Related Art

It is preferable that the loss of a laser beam incoming to a laser-beam wavelength conversion device (hereafter referred to as wavelength conversion device) and that of a wavelength converted beam generated in the device are decreased. Therefore, according to a conventional wavelength conversion device, a nonreflective coat against an incoming laser beam or wavelength converted beam is applied to a plane to which a beam is input (hereafter referred to as incoming plane) and a plane from which a beam is output (hereafter referred to as outgoing plane) respectively. Because the nonreflective coat is applied to the incoming and outgoing planes of the wavelength conversion device, it is possible to reduce the reflection loss of a laser beam at the incoming plane and that of a wavelength converted beam at the outgoing plane.

Moreover, a method for forming the incoming and outgoing lanes of a wavelength conversion device so as to have a Brewster's angle is known as conventional art for controlling the reflection loss of a beam without applying a nonreflective coat to the planes of the device.

The official gazette of Japanese Patent Laid-Open No. 1989-82683 discloses a harmonic-generation solid-state laser in which a laser crystal and a wavelength conversion device are joined and arranged in a resonator. In the case of the conventional laser, one end face of the laser crystal is formed so as to have a Brewster's angle to an optical axis and the other end of it is formed so as to be vertical to the optical axis. The wavelength conversion device is joined to a plane vertical to the optical axis of the layer crystal. A dielectric thin film serving as a nonreflective coat is formed on the joined plane and the other-side plane of the wavelength conversion device.

Moreover, the official gazette of Japanese Patent Laid-Open No. 1991-179331 discloses that the both end faces to which a laser beam is input is formed so as to have a Brewster's angle to the optical axis of the laser beam. A harmonic (converted beam) whose wavelength is converted in the conversion device is reflected into the device at a plane formed so as to have the Brewster's angle and thereafter output to the outside of the device. A thin film with a low reflectance to the harmonic, that is, a nonreflective coat is applied to the plane of the wavelength conversion device from which the harmonic is output.

In recent years, the necessity for using an ultraviolet laser beam for fine working and semiconductor processes has been increased. Therefore, it is desired to obtain a stable and high-power ultraviolet laser beam. To practically obtain an ultraviolet laser beam, there is a method of using an infrared laser beam such as Nd:YAG laser beam, Nd:YLF laser beam, or Yb:YAG laser beam as a fundamental wave, making the fundamental beam enter a wavelength conversion device to convert the fundamental beam to a green beam, and thereafter further converting the green beam to an ultraviolet beam by the wavelength conversion device. A wavelength conversion device for converting a green wave to an ultraviolet beam is generally used in accordance with a one-pass wavelength conversion system. Therefore, it is desired to efficiently take in a green beam and emit an ultraviolet beam.

However, because borate devices capable of converting an incoming beam up to an ultraviolet beam such as BBO ($\beta$-$BaB_2O_4$), LBO ($LiB_3O_5$), and CLBO ($CsLiB_6O_{10}$) have a hygroscopic property, it is very difficult to apply a nonreflective coating capable of withstanding a high-power laser beam to the above devices. Moreover, even if a nonreflective coating is applied to the devices, there is a problem that the interface between the nonreflective coating and a crystal is slowly deteriorated and the output of a converted beam lowers.

SUMMARY OF THE INVENTION

It is an object of the present invention to provide a wavelength conversion device capable of stably and efficiently performing wavelength conversion in a high-power laser for a long time and an ultraviolet beam generator provided with the wavelength conversion device.

It is another object of the present invention to provide a wavelength conversion device capable of stably and efficiently performing wavelength conversion for a long time without being provided with a nonreflective coating and an ultraviolet beam generator provided with the device.

It is still another object of the present invention to provide a wavelength conversion device capable of performing stable wavelength conversion even under the condition of a high humidity and an ultraviolet beam generator provided with the wavelength conversion device.

To achieve the above objects, a wavelength conversion device of the present invention is provided with an incoming plane formed so as to have a first Brewster's angle to an incoming laser beam and an outgoing plane formed so as to have a second Brewster's angle to a converted beam generated inside.

Moreover, an ultraviolet beam generator of the present invention is provided with a laser resonator for outputting ordinary rays with a wavelength of 532 nm and a wavelength conversion device which converts the ordinary rays output from the laser resonator to extraordinary rays with a wavelength of 266 nm, and whose incoming plane is formed so as to have a first Brewster's angle to the ordinary rays and whose outgoing plane is formed so as to have a second Brewster's angle to the extraordinary rays.

BRIEF DESCRIPTION OF THE DRAWINGS

The above and other objects, features, and advantages of the present invention will become more apparent from the following detailed description taken with the accompanying drawings in which.

DETAILED DESCRIPTION

Figure 1:
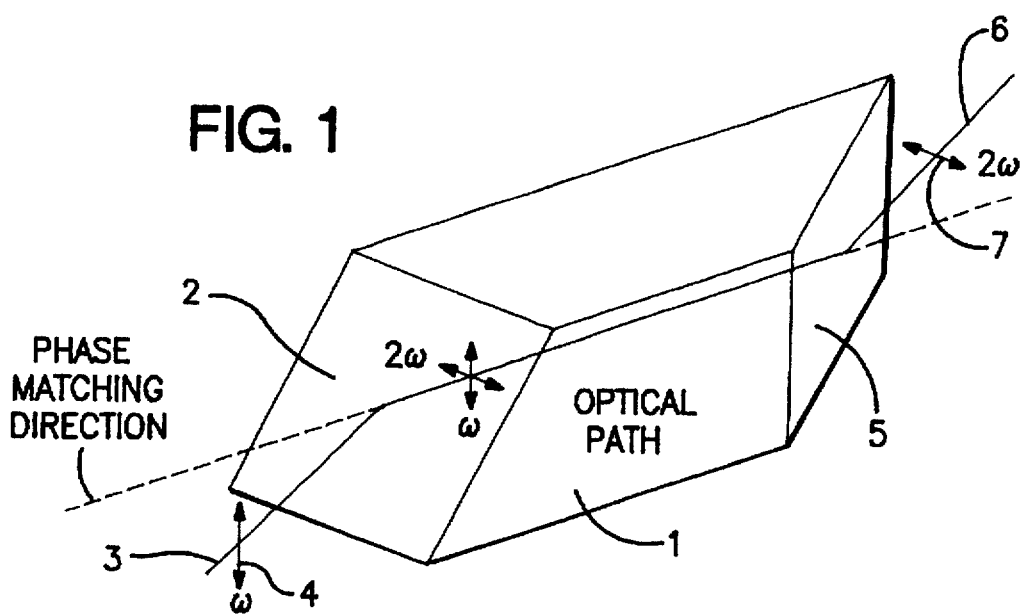
FIG. 1 is an illustration showing a structure of an embodiment of a wavelength conversion device of the present invention.

An embodiment of a wavelength conversion device of the present invention is described below in detail.

When wavelength conversion is performed in one pass by using a wavelength conversion device formed from a uniaxial crystal such as a borate crystal capable of converting a wavelength up to an ultraviolet region, a method is used in which an incoming laser beam is used as an ordinary ray and a converted beam produced in the wavelength conversion device is output as an extraordinary ray. In this case, the deflection direction of the incoming laser beam perpendicularly intersects that of the outgoing converted beam. In this method, it is desired that the incoming laser beam is input to the incoming plane of the wavelength conversion device in a nonreflective manner and only the converted beam produced in the device is output from the outgoing plane of the device in a nonreflective manner.

In this embodiment, the incoming plane of a wavelength conversion device is formed so as to have a Brewster's angle to the incoming laser beam and the outgoing plane of the device is formed so as to have a Brewster's angle while considering a deflection direction to the converted beam. The wavelength conversion device thus formed can input or output an incoming laser beam and a converted beam with no loss. Moreover, because no coating is applied, the surface of the wavelength conversion device is not deteriorated and therefore, it is possible to efficiently perform stable wavelength conversion for a long time.

The above Brewster's angle $\theta_B$ is calculated by the following expression.

$$\theta_B = \arctan(n_2/n_1) \quad (1)$$

In the case wherein the angle is the Brewster's angle $\theta_B$ (IN) at the incoming plane side of a wavelength conversion device, $n_1$ denotes a refractive index of an atmosphere through which a laser beam passes before the laser beam enters the wavelength conversion device and $n_2$ denotes a refractive index of a substance which the laser beam passes after the laser beam enters the wavelength conversion device. In the case wherein the angle is the Brewster's angle $\theta_B$ (OUT) at the outgoing plane side of the wavelength conversion device, $n_1$ denotes a refractive index of a substance through which a laser beam passes before the laser beam is output from a wavelength conversion device and $n_2$ denotes a refractive index of an atmosphere after the laser beam is output from the wavelength conversion device. A Brewster's angle is effective for a p-polarization beam polarized in parallel with an incoming plane formed by the propagation direction of an incoming beam and the normal of an interface and an s-polarization beam perpendicularly intersecting the p-polarization beam direction is reflected up to approximately 15%.

A method for obtaining a harmonic beam (wavelength: 2ω) of an extraordinary ray by making a basic wave (wavelength: ω) of an ordinary ray enter a wavelength conversion device is described below.

The Brewster's angle $\theta_B$ (IN) at the incoming plane side of the wavelength conversion device is calculated in accordance with the above expression 1 by assuming the refractive index of the atmosphere outside of the wavelength conversion device is assumed as $n_1$ and the refractive index of the ordinary ray with a wavelength (ω) of a laser beam incoming into the wavelength conversion device as $n_2$. By making a laser beam (ordinary beam) length conversion device so that the polarization direction coincides with that of a p-polarization beam and the angle between the propagation direction of the beam and the normal of the incoming plane comes to $\theta_B$ (IN), the laser beam is introduced into the wavelength conversion device in a nonreflective manner. Because the converted beam produced in the wavelength conversion device becomes an extraordinary ray, the deflection direction of the converted beam perpendicularly intersects the deflection direction of the incoming beam. Then, the Brewster's angle $\theta_B$ (OUT) at the outgoing plane side of the wavelength conversion device is calculated by assuming the refractive index of the extraordinary ray with a wavelength of 2ω as $n_1$ and that of the atmosphere as $n_2$. By forming the outgoing plane of the device so that the polarization direction of the converted beam coincides with that of a p-polarization beam and the angle between the propagation direction of the beam in the wavelength conversion device and the normal of the outgoing plane of the device comes to $\theta_B$ (OUT), the converted beam produced in the device can be emitted in a nonreflective manner to the outgoing plane of the device. It is necessary to make the optical path propagating in the device coincide with the phase matching direction.

Figure 2:
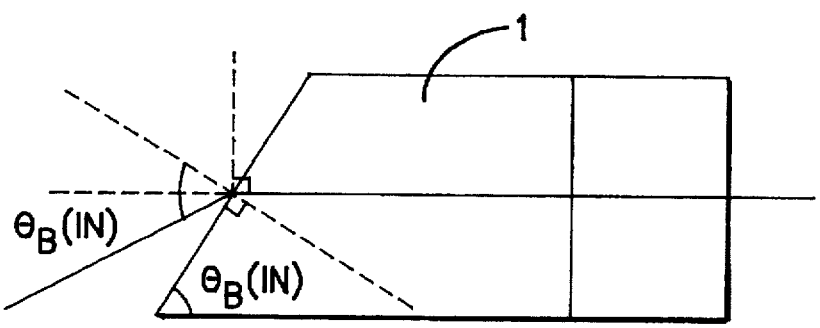
FIG. 2 is an illustration showing the optical path of the wavelength conversion device shown in FIG. 1 through the incoming plane side of the device.
Figure 3:
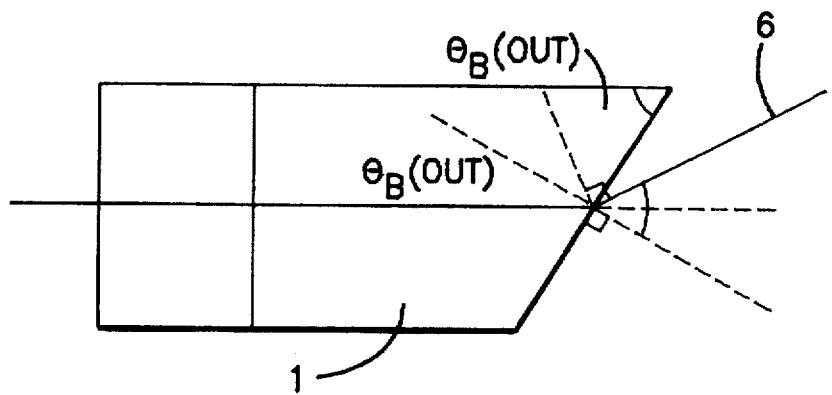
FIG. 3 is an illustration showing the optical path of the wavelength conversion device shown in FIG. 1 through the outgoing plane side of the device.

The structure of the wavelength conversion device of this embodiment is described below by referring to FIGS. 1 to 3.

A wavelength conversion device is described below which wavelength-converts a second harmonic (SHG, wavelength: 532 nm) of an Nd:YAG laser using BBO to a fourth harmonic (FHG, wavelength: 266 nm). The refractive index $n_0$ (ω) of the device of the ordinary ray with a wavelength of 532 nm and the refractive index $n_e$ (2ω) of the device of an extraordinary ray with a wavelength of 266 nm are both 1.6742. Moreover, it is assumed that the wavelength conversion device is used in air and the refractive index of the external atmosphere (air) is equal to 1.

The Brewster's angle of the incoming plane 2 of a wavelength conversion device 1 comes to $\theta_B$ (IN)=arctan (1.6742/1)=59.15°. The Brewster's angle of the outgoing plane 5 of the wavelength conversion device 1 comes to $\theta_B$ (OUT)=arctan (1/1.6742)=30.85°. FIG. 1 shows the wavelength conversion device 1 whose incoming plane 2 and outgoing plane 5 are formed at the Brewster's angles $\theta_B$ (IN) and q$_B$ (OUT) calculated as described above by also considering the polarization direction. The relationship between the incoming laser beam 3 at the incoming plane 2 side of the wavelength conversion device 1, the optical path of a converted beam, and the Brewster's angle $\theta_B$ (IN) is shown in FIG. 2. The relationship between the converted beam at the outgoing plane 5 side of the wavelength conversion device, an outgoing converted beam 6, and the Brewster's angle $\theta_B$ (OUT) is shown in FIG. 3. The polarization direction (ω) 4 of the incoming laser beam 3 and the polarization direction (2ω) of the outgoing converted beam 6 which are perpendicularly intersected each other are shown in FIG. 1.

Furthermore, it is preferable to use the wavelength conversion device 1 of this embodiment while heating it in order to protect the surface of the wavelength conversion device from moisture in air. Particularly, it is preferable to protect the wavelength conversion device of this embodiment from moisture in air by heating it because no nonreflective coating is applied to the incoming or outgoing plane of the wavelength conversion device.

Figure 4:
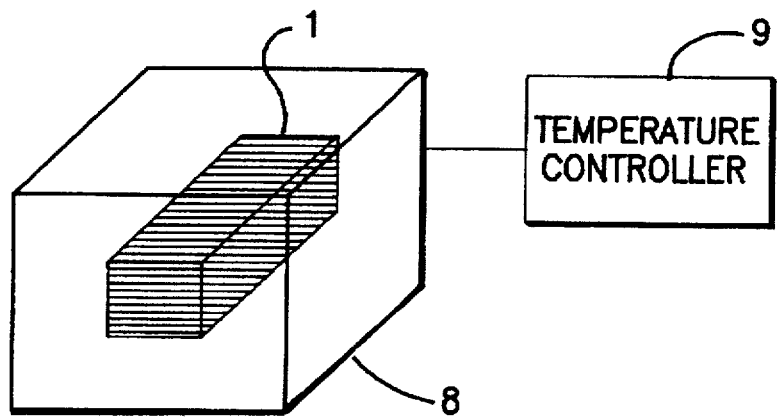
FIG. 4 is an illustration showing a structure for using the wavelength conversion device of the embodiment in FIG. 1 by heating the device.

In FIG. 4, the wavelength conversion device 1 is set in a cell 8 whose temperature is controlled by an exothermic resistor. The temperature of the wavelength conversion device 1 is controlled by a temperature controller 9 and therefore, the wavelength conversion device 1 can be kept at a constant temperature in a range from 50° to 200° C. Thus, by using the wavelength conversion device 1 while heated at a constant temperature, it is possible to protect the surface of the wavelength conversion device from moisture in air.

Figure 5:
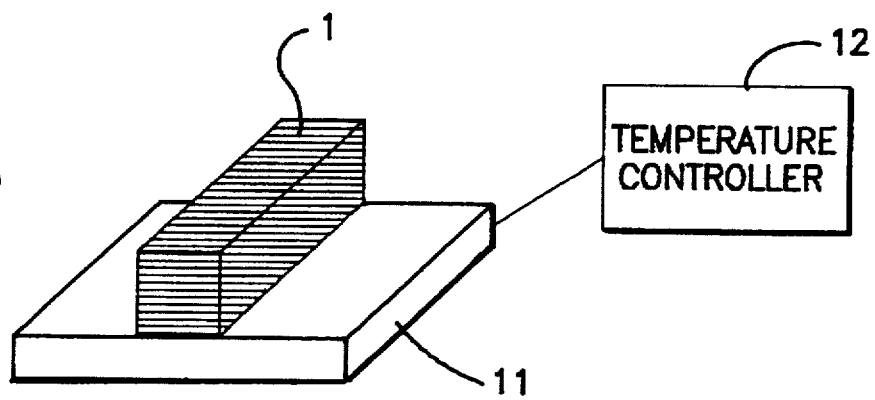
FIG. 5 is an illustration showing another structure for using the wavelength conversion device of the embodiment in FIG. 1 by heating the device.

In an embodiment shown by FIG. 5, the wavelength conversion device 1 is set on a Peltier device 11. The temperature of the wavelength conversion device 1 is controlled by a temperature controller 12 and therefore, the wavelength conversion device 1 is kept at a constant temperature in a range from 20° to 80° C.

Thus, by keeping the wavelength conversion device at a temperature higher than room temperature, it is possible to protect the device from moisture in air and stably perform wavelength conversion for a long time. Moreover, to protect the surface of a wavelength conversion device and improve the environment resistance of it, it is preferable to form a protective coat which can easily be formed compared to a nonreflective coating on the incoming and outgoing planes of the wavelength conversion device of this embodiment.

Figure 6:
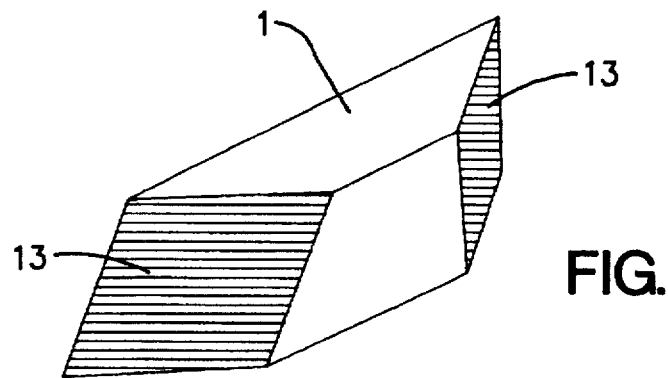
FIG. 6 is an illustration showing the wavelength conversion device of the embodiment in FIG. 1 with an MgF$_2$ film applied to the incoming and outgoing planes.

In FIG. 6, the incoming and outgoing planes of the wavelength conversion device 1 is coated with an Mg film 13 superior in the deterioration property to an ultraviolet laser beam at a thickness of approx. 10 m. Thereby, the incoming and outgoing planes of the wavelength conversion device 1 are protected from moisture in air.

Figure 7:
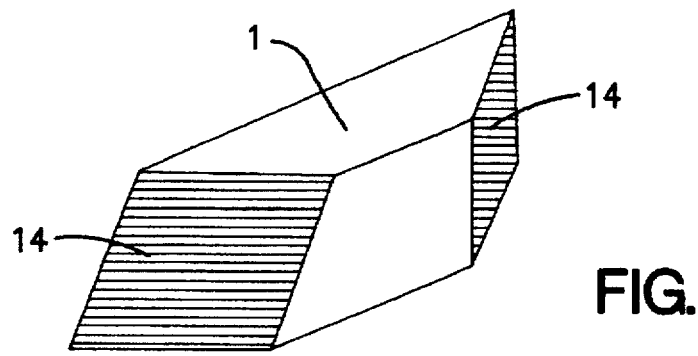
FIG. 7 is an illustration showing the wavelength conversion device of the embodiment in FIG. 1 with a surface layer formed by annealing and applied to the incoming and outgoing planes.

In FIG. 7, a surface layer 14 is formed on the incoming and outgoing planes of the wavelength conversion device 1, which is produced by scanning the planes with a $CO_2$ laser beam having an average power of approx. 100 W to slightly melt the planes and combining dangling bonds on the surface of the wavelength conversion device 1 each other. By forming the surface layer 14 on the surface of the wavelength conversion device 1, the moisture resistance is improved.

Then, an ultraviolet beam generator using the wavelength conversion device of this embodiment is described below by referring to FIG. 8.

Figure 8:
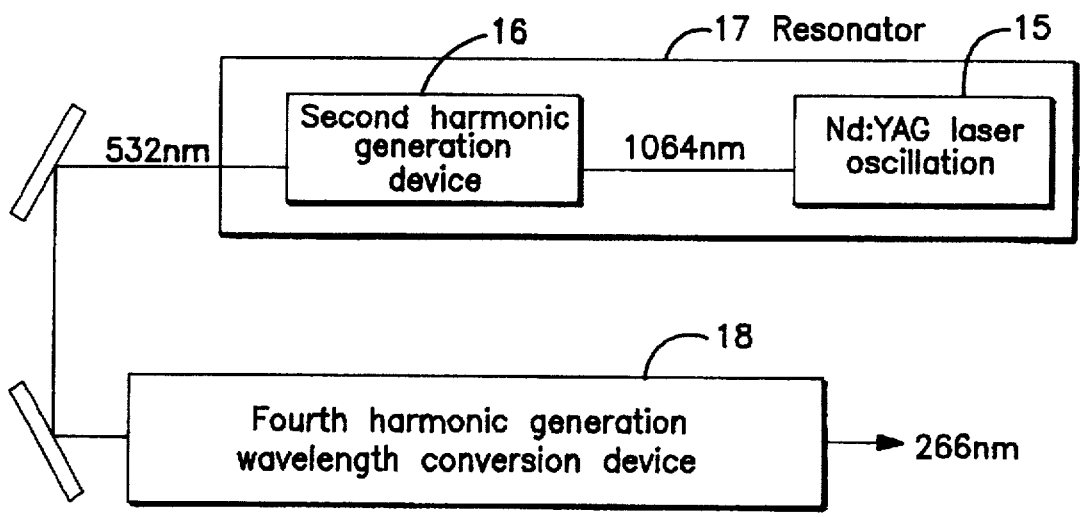
FIG. 8 is an illustration showing a structure of an ultraviolet beam generator using the wavelength conversion device of the embodiment in FIG. 1.

In FIG. 8, a laser beam with a wavelength of 1,064 nm emitted from an Nd:YAG laser 15 is wavelength-converted to a beam with a wavelength of 532 nm by a second harmonic generation device 16 of a KTP crystal or LBO crystal disposed in a resonator 17. The beam with a wavelength of 532 nm enters the wavelength conversion device of this embodiment additionally provided with a temperature regulating mechanism, particularly a BBO fourth harmonic generation device 18 in the form of p-polarization and thereby introduced into the wavelength conversion device 18 in a nonreflective manner. The beam introduced into the wavelength conversion device 18 is wavelength-converted to a beam with a wavelength of 266 nm in the device 18. The wavelength-converted beam comes to an s-polarization beam and is output to the outside of the device 18 from the outgoing plane of the device 18 in a nonreflective manner.

Then, results of experiments for wavelength conversion by using the wavelength conversion device of this embodiment are discussed below. It was attempted to input a beam which was a second harmonic (wavelength: 532 nm) of an Nd:YAG laser to the wavelength conversion device of this embodiment as a 100-ns pulse beam with a repetitive frequency of 5 KHz and an average output of 5 W and wavelength-convert the pulse beam to a beam which was a fourth harmonic with a wavelength of 266 nm. The average power of the fourth harmonic beam output from the wavelength conversion device came to approximately 1 W and it was possible to stably hold the output power for 100 hr. To protect the surface of the wavelength conversion device from moisture in the air, the device was kept at a temperature of 50° to 100° C.

By laser-annealing the incoming and outgoing planes of the wavelength conversion device and thereby using the wavelength conversion device on whose incoming and outgoing planes a protective coat for controlling the hygroscopicity is formed. It was possible to keep a stable output for 100 hr or more even under a condition in which the external atmosphere was very humid Results of comparing the characteristics of the wavelength conversion device of this embodiment with those of a conventional wavelength conversion device are discussed below.

It was attempted to input a beam which is a second harmonic (wavelength: 532 nm) of an Nd:YAG laser to the conventional wavelength conversion device to whose incoming plane a nonreflective coating to a wavelength of 532 nm is applied and to whose outgoing plane a nonreflective coating to a wavelength of 266 nm is applied as a 100-ns pulse beam with a repetitive frequency of 5 KHz and an average output of 5 W and wavelength-convert the pulse beam to a converted beam which is a fourth harmonic with a wavelength of 266 nm. An average of approx. 1 W was obtained as the output of the converted beam for 5 hours. Thereafter, however, the output was slowly lowered, and came to 950 mW after 10 hour and came to 800 mW after 50 hours. Thus, it was proved that the wavelength conversion device of this embodiment is superior in the output stability. Moreover, as the result of observing the surface of the device by a differential deflection microscope, it was found that damage occurred on the interface between the nonreflective coatings at the positions of the incoming and outgoing planes of the device to which a laser beam was applied and the device.

The same experiment was attempted by using the same laser beam as the above mentioned and using a wavelength conversion device whose incoming and outgoing planes were formed so as to have a Brewster's angle only to a laser beam with a wavelength of 532 nm. However, only an output of 850 mW which was reduced by approximately 15% was obtained because the converted beam with a wavelength of 266 nm had a reflection loss on the outgoing plane of the device. As the result, it is found that the wavelength conversion device of this embodiment can obtain a sufficient output compared to the conventional wavelength conversion device whose incoming and outgoing planes are formed so as to have a Brewster's angle to an incoming laser beam respectively.

The wavelength conversion device of this embodiment is not restricted to a wavelength conversion device made of a BBO, LBO, or CLBO crystal. It is also possible to use a wavelength conversion device made of a borate crystal having a hygroscopic property such as CBO ($Csb_3O_5$), KBBF ($KBeBO_3F_2$), or SBBO ($Sr_2Be_2BO_7$).

It is apparent that the scope of the invention is not limited to the above-described embodiment, but encompasses the scope technically equivalent thereto.

What is claimed is:

1. A laser-beam wavelength conversion device made of a borate crystal, comprising:
   an incoming plane formed on said borate crystal so as to have a first Brewster's angle according to a first wavelength of an incoming laser beam; and
   an outgoing plane formed on said borate crystal so as to have a second Brewster's angle according to a second wavelength of a converted beam produced inside, wherein said first Brewster's angle and said second Brewster's angle are different from each other, and formed in different polarization directions.

2. The laser-beam wavelength conversion device according to claim 1, wherein
   said first and second Brewster's angles are effective for the deflection directions of said incoming laser beam and converted beam respectively.

3. A laser-beam wavelength conversion device as claimed in claim 1, wherein said first wavelength of said incoming laser beam is 532 nm and said second wavelength of said converted beam is 266 nm, and said first Brewster's angle is 59.15° and said second Brewster's angle is 30.85°.

4. A laser-beam wavelength conversion device as claimed in claim 3, wherein said borate crystal is made of β-barium borate.

5. A laser-beam wavelength conversion device crystal, comprising:
   an incoming plane formed on said crystal so as to have a first Brewster's angle according to a first wavelength of an incoming laser beam; and
   an outgoing plane formed on said crystal so as to have a second Brewster's angle according to a second wavelength of a converted beam produced inside, wherein said first Brewster's angle and said second Brewster's angle are different from each other.

6. The device of claim 5, wherein
   said first and second Brewster's angles are effective for the deflection directions of said incoming laser beam and converted beam respectively.

7. The device of claim 5, wherein said first Brewster's angle is 59.15° and said second Brewster's angle is 30.85°.

8. The device of claim 5, wherein said crystal is made of β-barium borate.

* * * * *